(12) United States Patent
Tanahashi et al.

(10) Patent No.: US 8,679,702 B2
(45) Date of Patent: Mar. 25, 2014

(54) FUEL CELL MODULE AND MANUFACTURING METHOD THEREOF

(75) Inventors: Hideaki Tanahashi, Komaki (JP); Yutaka Ishioka, Nagoya (JP); Shinichi Haga, Kakamigahara (JP); Hideya Kadono, Komaki (JP); Kenji Sato, Toyota (JP); Fumishige Shizuku, Seto (JP)

(73) Assignees: Tokai Rubber Industries, Ltd., Komaki-shi (JP); Toyota Jidosha Kabushiki Kaisha, Toyota (JP)

( * ) Notice: Subject to any disclaimer, the term of this patent is extended or adjusted under 35 U.S.C. 154(b) by 389 days.

(21) Appl. No.: 12/414,206

(22) Filed: Mar. 30, 2009

(65) Prior Publication Data
US 2009/0253014 A1 Oct. 8, 2009

(30) Foreign Application Priority Data
Apr. 4, 2008 (JP) ................. 2008-097876

(51) Int. Cl.
*H01M 2/08* (2006.01)
(52) U.S. Cl.
USPC ........... 429/510; 429/460; 429/469; 429/508; 429/509
(58) Field of Classification Search
USPC .................. 429/510, 508, 509, 460, 469
See application file for complete search history.

(56) References Cited

U.S. PATENT DOCUMENTS

| | | | |
|---|---|---|---|
| 5,264,299 A | 11/1993 | Krasij et al. | |
| 6,057,054 A | 5/2000 | Barton et al. | |
| 2004/0137307 A1 | 7/2004 | Okonogi et al. | |
| 2005/0014056 A1* | 1/2005 | Zuber et al. | 429/34 |
| 2005/0020740 A1* | 1/2005 | Matsunaga et al. | 524/261 |
| 2005/0100776 A1* | 5/2005 | Brunk et al. | 429/35 |
| 2005/0233200 A1* | 10/2005 | Miller | 429/38 |
| 2005/0255362 A1* | 11/2005 | Miyazawa | 429/35 |
| 2006/0036017 A1 | 2/2006 | Gronowski et al. | |
| 2006/0183014 A1 | 8/2006 | Levandoski et al. | |
| 2007/0210475 A1* | 9/2007 | Pflaesterer | 264/129 |
| 2009/0162718 A1* | 6/2009 | Extrand | 429/30 |

FOREIGN PATENT DOCUMENTS

| | | |
|---|---|---|
| JP | A-08-045517 | 2/1996 |
| JP | A-2003-068332 | 3/2003 |
| JP | A-2005-011662 | 1/2005 |
| JP | A-2007-066766 | 3/2007 |
| JP | A-2007-149472 | 6/2007 |
| JP | A-2007-188834 | 7/2007 |
| JP | A-2008-123883 | 5/2008 |
| WO | WO 02/43172 A1 | 5/2002 |
| WO | WO 2007/064777 * | 6/2007 ............. H01M 8/10 |

OTHER PUBLICATIONS

Jan. 8, 2013 European Office Action issued in European Application No. 09 004 996.6.

* cited by examiner

*Primary Examiner* — Milton I Cano
*Assistant Examiner* — Jeremiah Smith
(74) *Attorney, Agent, or Firm* — Oliff PLC

(57) ABSTRACT

A fuel cell module includes: an electrode member having a membrane electrode assembly, which is formed from an electrolyte membrane and a pair of electrode catalyst layers that is disposed on both sides of the electrolyte membrane in the thickness direction, and having a pair of porous layers disposed on both sides of the membrane electrode assembly in the thickness direction; a separator disposed layered on the electrode member so as to contact at least one of the porous layers; and an adhesive rubber member sealing a peripheral edge portion of the electrode member, wherein the electrode member and the separator are integrated by the adhesive rubber member, and a tensile product of the adhesive rubber member is 1,500 MPa·% or more.

6 Claims, 10 Drawing Sheets

FUEL CELL MODULE AND MANUFACTURING METHOD THEREOF

INCORPORATION BY REFERENCE

The disclosure of Japanese Patent Application No. 2008-97876 filed on Apr. 4, 2008 including the specification, drawings and abstract is incorporated herein by reference in its entirety.

BACKGROUND OF THE INVENTION

1. Field of the Invention

The present invention relates to a fuel cell module in which an electrode member and a separator are integrated, and a manufacturing method thereof.

2. Description of the Related Art

A Fuel cell generating electricity from electrochemical reactions of gases has a high power generation efficiency and an extremely small impact on the environment since the discharged gas is clean. Among these, the proton-exchange membrane fuel cell is capable of operating at relatively low temperatures and has a large output density. For this reason, its application to various fields such as power generation and as a power source for automobiles is anticipated.

In the proton-exchange membrane fuel cell, a cell in which separators sandwich a membrane electrode assembly (MEA) or the like serves as the unit of power generation. The MEA is formed from a polymer membrane (electrolyte membrane) acting as an electrolyte, and a pair of electrode catalyst layers (a fuel electrode (anode) catalyst layer and an oxygen electrode (cathode) catalyst layer) respectively arranged on both sides of the electrolyte membrane in the thickness direction. On the surfaces of the pair of electrode catalyst layers a gas diffusion layer is further disposed. Fuel gas such as hydrogen is supplied to the fuel electrode side, while an oxidizing gas such as oxygen and air is supplied to the oxygen electrode side. The supplied gas, the electrolyte, and the electrode catalyst layers are subjected to an electrochemical reaction at the three-phase boundary to generate electricity. The proton-exchange membrane fuel cell is structured by sandwiching a cell stack in which a plurality of the above cells are stacked together between end plates or the like disposed on both ends of the fuel cell in the cell stacking direction.

A manifold serving as a flow path for gas or water is formed on the peripheral edge portion of the cell stack. Mixing of the gases supplied to the respective electrodes creates issues such as lowered power generation efficiency. Also, the electrolyte membrane exhibits proton conductance in a state with water contained therein. Therefore, during operation the electrolyte must maintain a wet state. Accordingly, in order to prevent gas mixing and leakage, as well as maintain a wet state within the cells, a seal member is disposed on the peripheral edge portion of the manifold and the MEA (see Japanese Patent Application Publication Nos. JP-A-2007-188834, JP-A-2007-149472, and JP-A-2007-66766 for examples).

As disclosed in Japanese Patent Application Publication Nos. JP-A-2007-188834 and JP-A-2007-149472, a gasket structure which integrates the electrode member and the seal member is known. In such the gasket structure, liquid rubber is poured into the peripheral edge portion of the electrode member which is formed from the MEA, the gas diffusion layer, and so forth, and injection molding is carried out.

However, such conventional gasket structures are plagued by the following three issues. The first issue is the low mechanical strength of the seal member. In the convention gasket structures, liquid rubber such as silicone rubber is used as the seal member. But most liquid rubber has a low molecular weight. As a consequence, there is little tensile strength after crosslinking. Since the liquid rubber also does not stretch much, the liquid rubber does not easily follow the expansion and contraction of the electrolyte membrane as a result of moisture and the like. Furthermore, silicone rubber does not have sufficient adhesiveness or acid resistance, which is problematic in terms of sealability and durability.

The second issue concerns the need for special treatment when liquid rubber is used so that the liquid rubber does not excessively impregnate a porous layer during molding. Namely, when pouring and molding liquid rubber into the peripheral edge portion of the electrode member, the liquid rubber impregnates porous layers such as the gas diffusion layer. In such case, impregnation of the liquid rubber is difficult to control. Therefore, the flow of gas is impeded at regions excessively impregnated with the liquid rubber, and power generation performance is reduced by a corresponding amount. To regulate the amount of liquid rubber impregnated, in Japanese Patent Application Publication No. JP-A-2007-188834 for example, the porosity of a part of the porous layer is decreased in advance by plugging or the like. Also, in Japanese Patent Application Publication No. JP-A-2007-149472, a part of the porous layer is compressed to increase density.

The third issue is the risk of deformation of the electrolyte membrane during injection molding due to the injection pressure of the liquid rubber. The electrolyte membrane is a thin polymer film. Therefore, the flow of liquid rubber during injection molding may press against and deform the electrolyte membrane. If the electrolyte membrane is deformed, obtaining a desired power generation performance becomes difficult.

As mentioned above, the proton-exchange membrane fuel cell is structured by stacking a plurality of electrode members, in which the MEA, the gas diffusion layer, and the like are stacked, via separators. In addition to the positioning of each member, the stacking operation performed while maintaining each of the members at predetermined positions is difficult. For this reason, the assembly operation is extremely laborious and results in poor productivity. As examples, according to the gasket structures disclosed in Japanese Patent Application Publication Nos. JP-A-2007-188834, JP-A-2007-149472, and JP-A-2007-66766, the electrode member is integrated, which facilitates stacking by a corresponding amount. However, since the gasket structure and the separators are separate, the above issue is not resolved due to the difficulty of positioning and so forth. Accordingly, the assembly operation must be made more efficient. Inspections are also sometimes required to determine whether there are defects in any of the cells. However, it is difficult at present to take apart an assembled proton-exchange membrane fuel cell for inspection and repair.

SUMMARY OF THE INVENTION

The present invention has been developed in view of such circumstances, and it is an object of the present invention to provide a fuel cell module in which an electrode member and a separator are integrated using an adhesive rubber member with high sealability, and a manufacturing method thereof.

(1) According to a first aspect of the present invention, a fuel cell module includes: an electrode member having a membrane electrode assembly, which is formed from an electrolyte membrane and a pair of electrode catalyst layers that is disposed on both sides of the electrolyte membrane in the thickness direction, and having a pair of porous layers disposed on both sides of the membrane electrode assembly in the thickness direction; a separator disposed layered on the electrode member so as to contact at least one of the porous layers; and an adhesive rubber member sealing a peripheral edge portion of the electrode member, wherein the electrode member and the separator are integrated by the adhesive rubber member, and a tensile product of the adhesive rubber member is 1,500 MPa·% or more.

In the fuel cell module according to the present invention, the electrode member and the separator are integrated by the adhesive rubber member. Therefore, a fuel cell can be easily assembled mainly by stacking the fuel cell modules of the present invention. This in turn improves productivity. In addition, each module can be extracted as necessary to enable inspection and repair. If a failure occurs in a module, it is also easy to replace only that particular module.

According to the fuel cell module of the present invention, the peripheral edge portion of the electrode member is sealed by the adhesive rubber member. Here, the tensile product of the adhesive rubber member is equal to or greater than 1,500 MPa·%. As a consequence, the sealed regions have good durability. The tensile product is defined as a product of tensile strength and breaking elongation, i.e., [tensile strength (MPa)×breaking elongation (%)]. A larger tensile product indicates that more energy is required to break. In the present specification, values measured in accordance with JIS K6251 (2004) are employed for the tensile strength and breaking elongation. Measurements for tensile strength and breaking elongation were performed using No. 5 dumbbell specimens. In addition, the adhesive rubber member has adhesiveness. There is thus no need to use a separate adhesive agent, and the electrode member and the separator can be strongly adhered together by the adhesive rubber member.

(2) According to a second aspect of the present invention, in the above configuration of (1), it is referable that the adhesive rubber member is formed from solid rubber, and the electrode member and the separator are stacked, and a pre-crosslinking composition of the solid rubber is arranged so as to coat the peripheral edge portion of the electrode member and contact the separator, whereby the electrode member, the separator and the solid rubber are integral molded.

The term "solid rubber" in the present specification is an expression to "liquid rubber" and refers to kneadable rubber that is a solid at room temperature. In other words, rubber in a solid state rather than liquid rubber is used in the present configuration. This consequently resolves the above three issues caused by using liquid rubber. That is, the adhesive rubber member has considerable tensile strength and elongation. Due to the use of solid rubber, the amount by which the porous layer is impregnated can be regulated. There is thus no need for special treatment during molding. Since liquid rubber is not used, there is also no risk of the electrolyte membrane deforming because of the injection pressure.

(3) According to a third aspect of the present invention, in the above configuration of (2), it is preferable that the pre-crosslinking composition of the solid rubber includes the following contents of (A) to (D): (A) at least one rubber component selected from a group consisting of ethylene-propylene rubber, ethylene-propylene-diene rubber, acrylonitrile-butadiene rubber, and hydrogenated acrylonitrile-butadiene rubber; (B) a crosslinking agent selected from organic peroxides of which a 1-hour half-life period temperature is lower than or equal to 130° C.; (C) a crosslinking auxiliary agent; and (D) an adhesive component formed of at least one of a resorcinol compound together with a melamine compound and a silane coupling agent.

A rubber in which the pre-crosslinking composition including the contents of the above (A) to (D) is made to crosslink has low gas permeability. Thus according to the present configuration, the sealability of the adhesive rubber member can be increased. In addition, organic peroxides of which a 1-hour half-life period temperature is lower than or equal to 130° C. are used as a crosslinking agent in the present configuration (the above (B)). Here, the term "half-life period" is a time until the concentration of the organic peroxide becomes half an initial value. Accordingly, the term "half-life period temperature" is indicative of the decomposition temperature of the organic peroxide. The term "1-hour half-life period" is the temperature when the half-life period is 1 hour. In other words, a lower 1-hour half-life period indicates a greater tendency toward decomposition at low temperatures. By using an organic peroxide whose 1-hour half-life period temperature is lower than or equal to 130° C., crosslinking can be achieved at a lower temperature (i.e., lower than or equal to 130° C.) and in a shorter period. Therefore, deterioration of the electrolyte membrane due to heating during molding (crosslinking) can also be suppressed. The crosslinking agent of (B) is not prone to curing defects caused by impurities, contamination, and the like. Therefore, the crosslinking agent of (B) is resistant to the effects of the surrounding environment during operations and easy to handle.

If a resorcinol compound and a melamine compound are used in the adhesive component of (D), then the melamine compound is the methylene donor and the resorcinol compound is the methylene recipient. During crosslinking, chemical bonds are formed between the resorcinol compound, and the rubber component and a mating member, due to the donation of a methylene group. Whereby, the rubber component and the mating member are adhered. If a silane coupling agent is used in the adhesive component of (D), then chemical bonds are formed between the rubber component and the mating member via the silane coupling agent, whereby both are adhered together. A high adhesion force is achieved due to these adhesive components, and the adhesion force is not prone to decreasing even in the operation environment of a fuel cell. Accordingly, good sealability can be secured even when the fuel cell is operated for a long period. In other words, the operation reliability of the fuel cell is improved.

(4) According to a fourth aspect of the present invention, in the above configuration of (1), it is preferable that among the pair of porous layers disposed on both sides of the membrane electrode assembly in the thickness direction, the porous layer disposed on one side of the membrane electrode assembly in the thickness direction has at least one of a gas diffusion layer, and a gas flow path layer whose porosity is larger than that of the gas diffusion layer, and the porous layer disposed on another side of the membrane electrode assembly in the thickness direction has at least one of a gas diffusion layer, and a gas flow path layer whose porosity is larger than that of the gas diffusion layer.

The structures of the respective porous layers arranged on both sides of the membrane electrode assembly (MEA) in the thickness direction may be identical or different. According to the present configuration, at least one of the pair of porous layers has a gas diffusion layer and a gas flow path layer. The gas diffusion layer serves to spread supplied gas in the thickness direction and supply gas to the entire surface of the adjacent electrode catalyst layer. Meanwhile, the gas flow path layer serves to supply gas delivered via the adjacent separator to the MEA or the gas diffusion layer. In other words, the gas flow path layer mainly serves to guide gas in a predetermined direction. Therefore in order to decrease the pressure loss of the gas flow and increase drainage, the porosity of the gas flow path layer is larger than that of the gas diffusion layer. For example, by structuring the two porous layers with different porosities, gas can be evenly supplied to all of one or another side of the MEA in the thickness direction.

(5) According to a fifth aspect of the present invention, in the above configuration of (4), it is preferable that at least one porous layer among the pair of porous layers has the gas diffusion layer, and an area of the membrane electrode assembly is larger than an area of at least one gas diffusion layer. For example, when the gas diffusion layer is respectively arranged on both sides of the MEA in the thickness direction, the leakage of gas from the end side of one of the gas diffusion layers to the end side of the other gas diffusion layer is suppressed by the adhesive rubber member, which has impregnated both end sides of the gas diffusion layers. However, even in a case where the adhesive rubber member does not sufficiently impregnate and there is gas leaking from the end side of one of the gas diffusion layers, if the area of the MEA is large as in the present configuration, then the adhesive rubber member coating the MEA and the peripheral edge portion thereof becomes a barrier and can reliably prevent gas from leaking to the end side of the other gas diffusion layer.

(6) According to a sixth aspect of the present invention, a first manufacturing method of a fuel cell module of the present invention includes the steps of: preforming a pre-cross linking composition of solid rubber having adhesiveness into a predetermined shape (a preforming step); stacking in a forming die an electrode member having a membrane electrode assembly, which is formed from an electrolyte membrane and a pair of electrode catalyst layers that is disposed on both sides of the electrolyte membrane in the thickness direction, and having a pair of porous layers disposed on both sides of the membrane electrode assembly in the thickness direction, and a separator, such that the separator contacts at least one porous layer and the preformed pre-crosslinking composition is arranged so as to coat a peripheral edge portion of the electrode member and contact the separator (a member arrangement step); and pressurizing and heating the forming die, whereby the pre-crosslinking composition crosslinks and impregnates the porous layers of the electrode member, and the electrode member and the separator are integrated by the solid rubber (an integration step).

In the first manufacturing method of the present invention, solid rubber is used instead of liquid rubber. Thus according to the first manufacturing method of the present invention, by arranging the preformed pre-crosslinking composition inside the forming die together with the electrode member and the separator and performing integral molding, the fuel cell module of the present invention can be easily manufactured.

In the member arrangement step, the preformed pre-crosslinking composition is used as a reference to enable easy positioning of the electrode member. In addition, an excessive portion of the pre-crosslinking composition with respect to the cavity of the forming die can be employed to regulate the impregnation amount of the solid rubber after integration. There is thus no need for special treatment in order to suppress excessive impregnation. Since liquid rubber is not used, there is also no risk of the electrolyte membrane deforming because of the injection pressure of the liquid rubber.

In the integration step, the peripheral edge portion of the electrode member is sealed by solid rubber (the adhesive rubber member). The solid rubber has adhesiveness and impregnates the end portion of the porous layer. For this reason, the peripheral edge portion of the electrode member has high sealability. In addition, the solid rubber has high tensile strength and elongation. Thus according to the first manufacturing method of the present invention, a fuel cell module can be manufactured with high durability at a sealed region.

(7) According to a seventh aspect of the present invention, a second manufacturing method of a fuel cell module of the present invention includes the steps of: preforming a pre-crosslinking composition of solid rubber having adhesiveness into a predetermined shape (a first preforming step); arranging in a preforming die an electrode member having a membrane electrode assembly, which is formed from an electrolyte membrane and a pair of electrode catalyst layers that is disposed on both sides of the electrolyte membrane in the thickness direction, and having a pair of porous layers disposed on both sides of the membrane electrode assembly in the thickness direction, and the preformed pre-crosslinking composition, such that a peripheral edge portion of the electrode member is coated by the pre-crosslinking composition, and pressurizing the preforming die while maintaining the preforming die at a temperature at which crosslinking does not occur in the pre-crosslinking composition to obtain a preform in which the pre-crosslinking composition is preliminarily integrated with the peripheral edge portion of the electrode member (a second preforming step); and stacking and arranging within a forming die the preform and a separator such that the separator contacts the pre-crosslinking composition and at least one of the porous layers of the electrode member, and pressurizing and heating the forming die such that the pre-crosslinking composition crosslinks and impregnates the porous layers of the electrode member, and the electrode member and the separator are integrated by the solid rubber (an integration step).

The second manufacturing method of the present invention has the same operations and effects as the first manufacturing method of the present invention with respect to the usage of solid rubber. Namely, the fuel cell module of the present invention can be easily manufactured by stacking and arranging in the forming die the separator and the preform, wherein the pre-crosslinking composition is preliminarily integrated with the peripheral edge portion of the electrode member, and then performing integral molding. In addition, an excessive portion of the pre-crosslinking composition with respect to the cavities of the preforming die and forming die can be employed to regulate the impregnation amount of the solid rubber after integration. There is thus no need for special treatment in order to suppress excessive impregnation.

According to the second manufacturing method of the present invention, in the second preforming step, the pre-crosslinking composition is preliminarily integrated with the peripheral edge portion of the electrode member to produce a preform. Therefore in the subsequent integration step, the positioning of the electrode member in which a plurality of members is stacked, the separator, and the preformed pre-crosslinking composition can be easily performed in comparison to individually arranging the members.

DETAILED DESCRIPTION OF THE EMBODIMENTS

Hereinafter, embodiments of a fuel cell module according to the present invention will be described.

<First Embodiment>

[Configuration of Proton-Exchange Membrane Fuel Cell]

Figure 1:
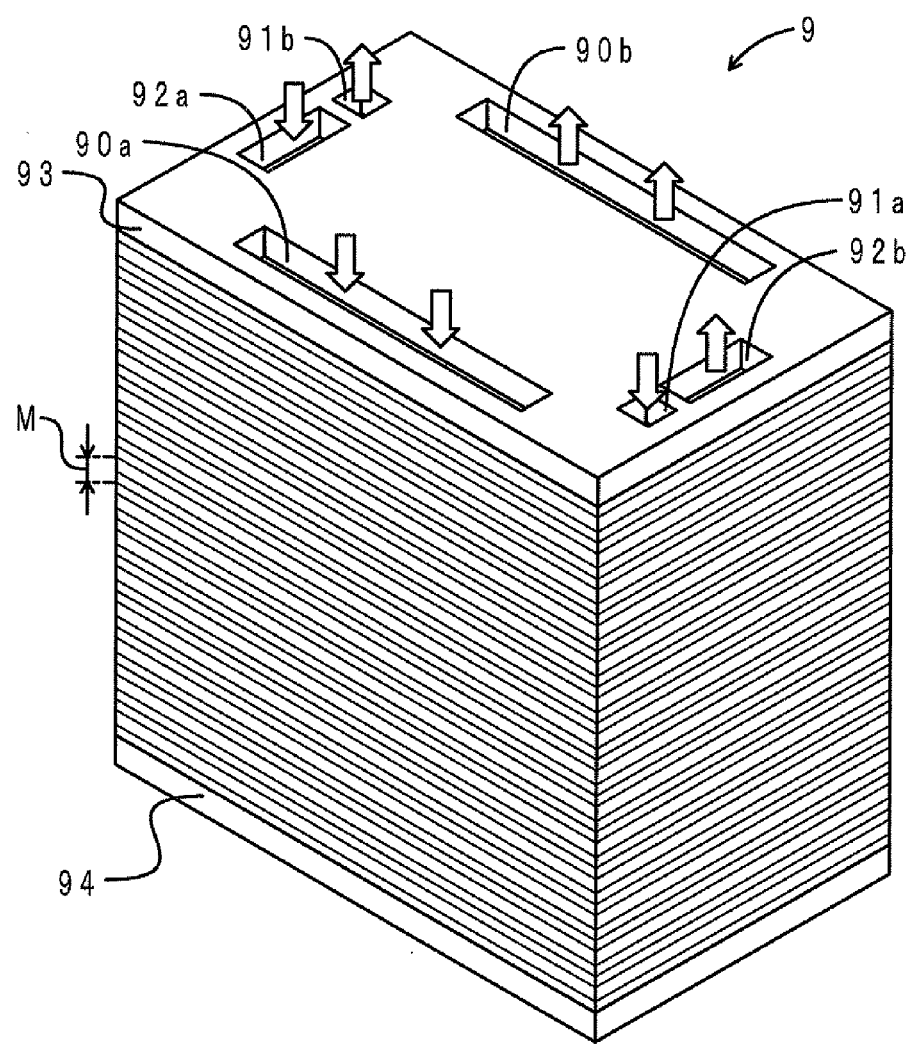
FIG. 1 is a perspective view of a proton-exchange membrane fuel cell provided with a fuel cell module according to a first embodiment of the present invention.

The configuration of a proton-exchange membrane fuel cell provided with a fuel cell module (referred to as a "module" below as appropriate) according to the present embodiment will be explained. FIG. 1 shows a perspective view of the proton-exchange membrane fuel cell. As illustrated in FIG. 1, a proton-exchange membrane fuel cell 9 is structured by a plurality of stacked modules M. End plates 93, 94 are respectively arranged on both ends in the stacking direction of the module M. The end plates 93, 94 are made of stainless steel and have a rectangular plate shape. Formed along the four sides of the end plate 93 are an air supply hole 90a that supplies air (oxidizing gas), an air discharge hole 90b that discharges air, a hydrogen supply hole 91a that supplies hydrogen (fuel gas), a hydrogen discharge hole 91b that discharges hydrogen, a coolant supply hole 92a that supplies coolant, and a coolant discharge hole 92b that discharges coolant. The module M is also formed with a plurality of through holes described later that correspond to the holes 90a, 90b, 91a, 91b, 92a, 92b. Accordingly, flow paths for air, hydrogen, and coolant are respectively provided penetrating in the stacking direction of the module M of the proton-exchange membrane fuel cell 9.

[Configuration of Fuel Cell Module]

Figure 2:
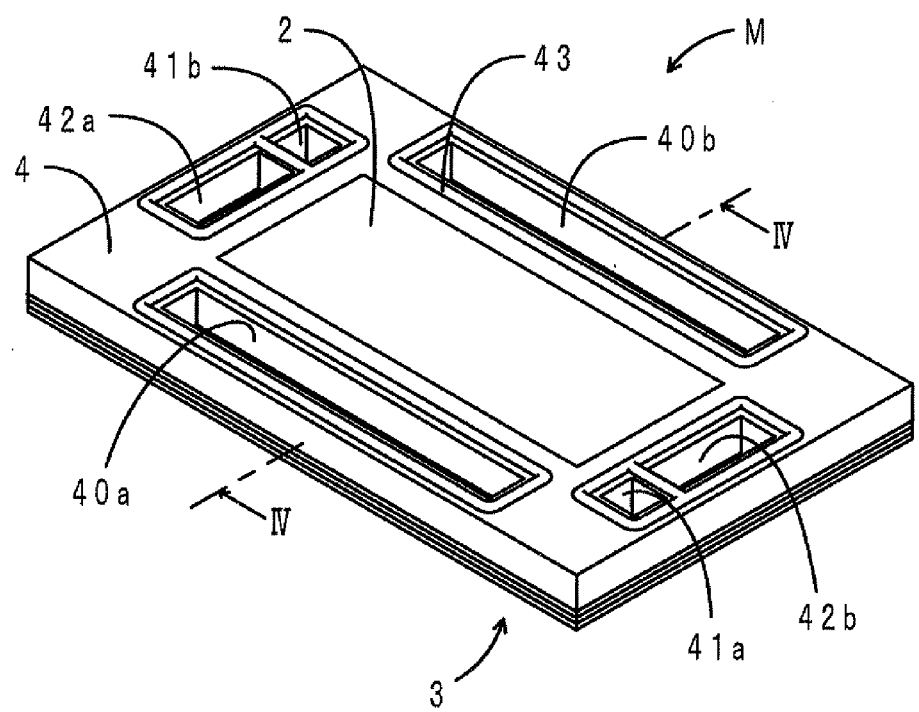
FIG. 2 is a perspective view of the fuel cell module.
Figure 3:
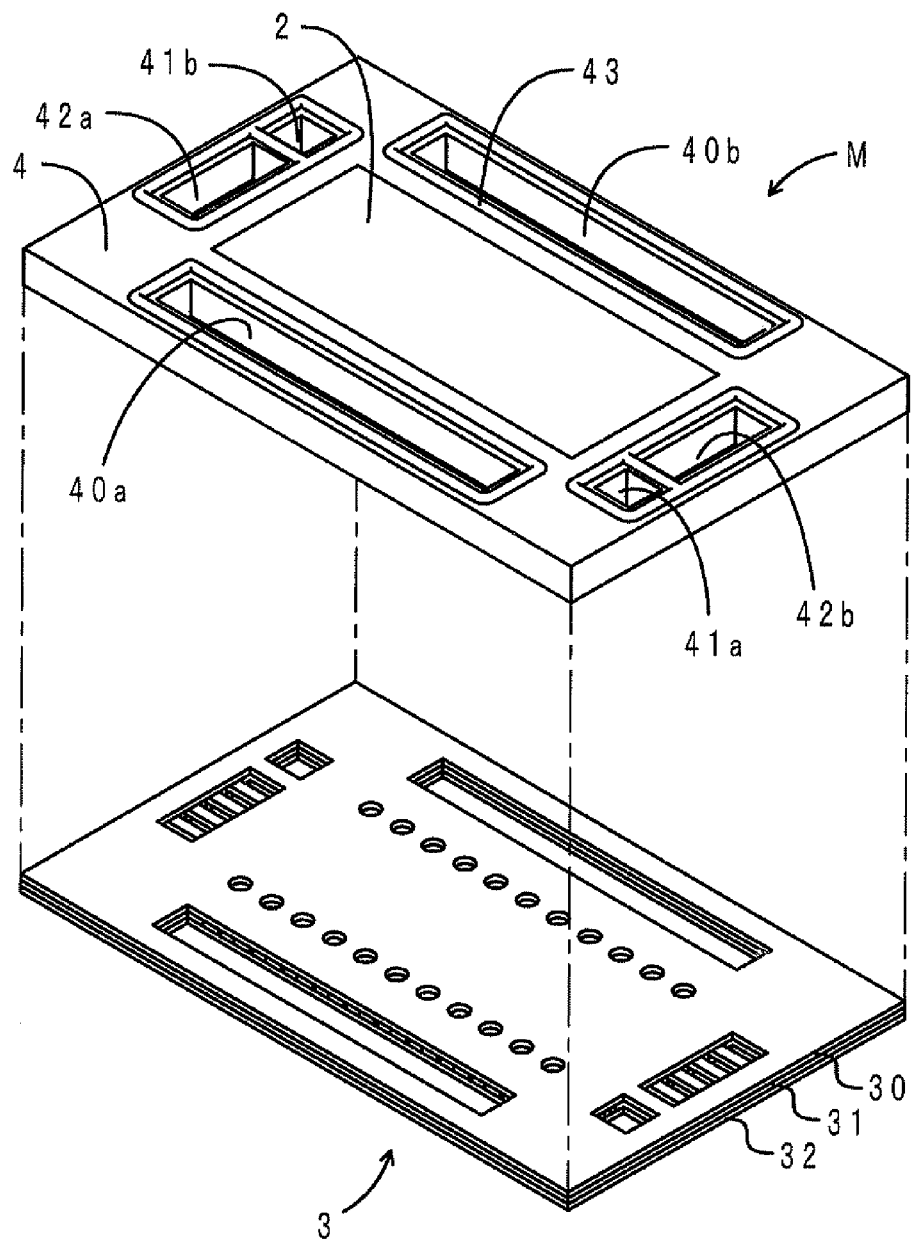
FIG. 3 is an exploded perspective view of the fuel cell module.
Figure 4:
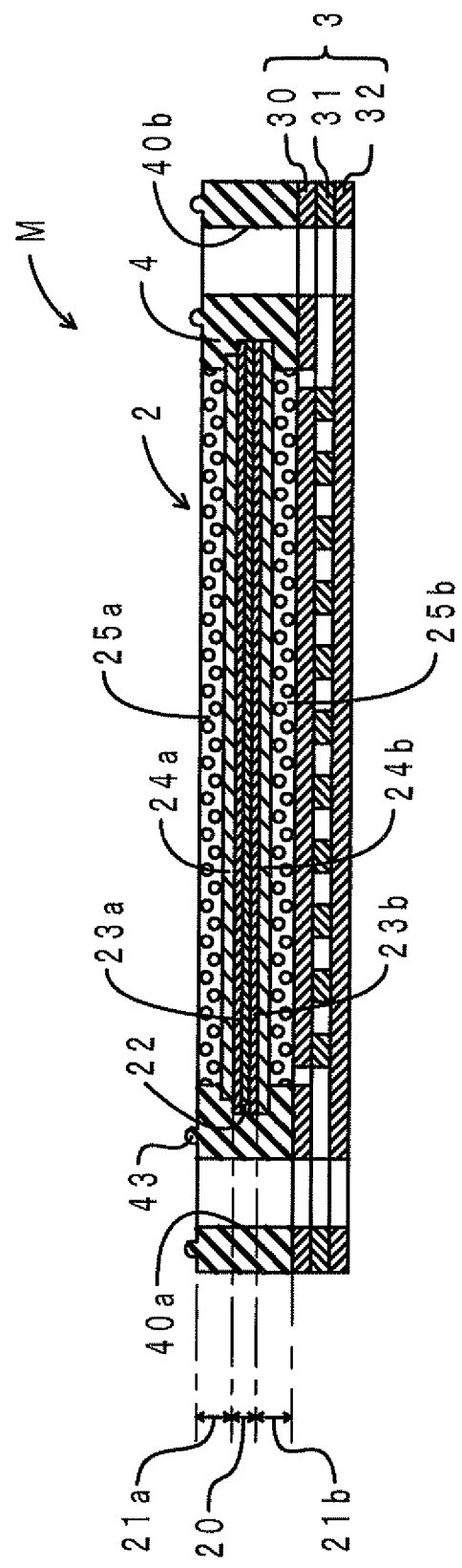
FIG. 4 is a IV-IV cross-sectional view of FIG. 2.

The configuration of the fuel cell module according to the present embodiment will be explained next. FIG. 2 shows a perspective view of the module M, and FIG. 3 shows an exploded perspective view of the module M. FIG. 4 shows a IV-IV cross-sectional view of FIG. 2. As illustrated in FIGS. 2 to 4, the module M has an electrode member 2, a separator 3, and an adhesive rubber member 4.

The electrode member 2 includes an MEA 20, an anode porous layer 21a, and a cathode porous layer 21b. The MEA 20 is formed from an electrolyte membrane 22, an anode catalyst layer 23a, and a cathode catalyst layer 23b.

The electrolyte membrane 22 is a perfluorosulfonic acid film, and has a thin rectangular plate shape. The anode catalyst layer 23a has a thin rectangular plate shape and is disposed so as to cover the top side of the electrolyte membrane 22. The anode catalyst layer 23a includes carbon particles that support platinum. The cathode catalyst layer 23b has the same structure as the anode catalyst layer 23a, and is disposed so as to cover the bottom side of the electrolyte membrane 22.

The anode porous layer 21a is provided with a gas diffusion layer 24a and a gas flow path layer 25a. The gas diffusion layer 24a is made of carbon paper and has a thin rectangular plate shape. The gas diffusion layer 24a is disposed on the top side of the anode catalyst layer 23a of the MEA 20. The porosity of the gas diffusion layer 24a is approximately 60%. The gas diffusion layer 24a has a generally similar configuration to the MEA 20. The gas diffusion layer 24a is also smaller than the MEA 20. Namely, the area of the gas diffusion layer 24a is smaller than the area of the MEA 20. Therefore, the outer edge of the gas diffusion layer 24a is disposed more inward than the outer edge of the MEA 20. The gas flow path layer 25a is made of sintered foam metal and has a thin rectangular plate shape. The gas flow path layer 25a is disposed on the top side of the gas diffusion layer 24a. The porosity of the gas flow path layer 25a is approximately 70 to 80%. The area of the gas flow path layer 25a is smaller than the area of the gas diffusion layer 24a.

The cathode porous layer 21b is provided with a gas diffusion layer 24b and a gas flow path layer 25b. The gas diffusion layer 24b has the same structure as the gas diffusion layer 24a and is disposed on the bottom side of the cathode catalyst layer 23b of the MEA 20. The area of the gas diffusion layer 24b is identical to the area of the MEA 20. Accordingly, the outer edge of the gas diffusion layer 24b is disposed on the same plane as the outer edge of the MEA 20. The gas flow path layer 25b has the same structure as the gas flow path layer 25a and is disposed on the bottom side of the gas diffusion layer 24b. The area of the gas flow path layer 25b is smaller than the area of the gas diffusion layer 24b.

The separator 3 has a rectangular plate shape and is arranged stacked below the electrode member 2. The separator 3 is formed by stacking, starting from the top, a cathode plate 30, an intermediate plate 31, and an anode plate 32. The cathode plate 30 is made of stainless steel and is disposed so as to contact the bottom side of the gas flow path layer 25b. The anode plate 32 is in contact with the top side of a module (not shown) that is stacked below the module M. The respective plates 30, 31, 32 structuring the separator 3 are each formed with a plurality of through holes. Accordingly, paths for air, hydrogen, and coolant are formed inside the separator 3.

The adhesive rubber member 4 has an oblong frame configuration and is formed from solid rubber with adhesiveness that uses ethylene-propylene-diene rubber (EPDM) as the rubber component. The tensile product of the adhesive rubber member 4 is 1,500 MPa·%. The adhesive rubber member 4 coats the peripheral edge portion of the electrode member 2 and adheres to the cathode plate 30 of the separator 3. Through holes 40a, 40b, 41a, 41b, 42a, 42b are formed along the four sides of the adhesive rubber member 4. The through hole 40a corresponds to the air supply hole 90a, the through hole 40b to the air discharge hole 90b, the through hole 41a to the hydrogen supply hole 91a, the through hole 41b to the hydrogen discharge hole 91b, the through hole 42a to the coolant supply hole 92a, and the through hole 42b to the coolant discharge hole 92b. A convex portion 43 is formed on the top side of the adhesive rubber member 4 so as to surround the respective through holes 40a, 40b, 41a, 41b, 42a, 42b. During stacking of the modules M and assembly of the proton-exchange membrane fuel cell 9, the convex portion 43 is pressed and deformed by a fastening force in the stacking direction. Thus, a seal line is formed around the respective through holes 40a, 40b, 41a, 41b, 42a, 42b, thereby suppressing the leakage of air, hydrogen, and coolant.

[Manufacturing Method of Fuel Cell Module]

Figure 5:
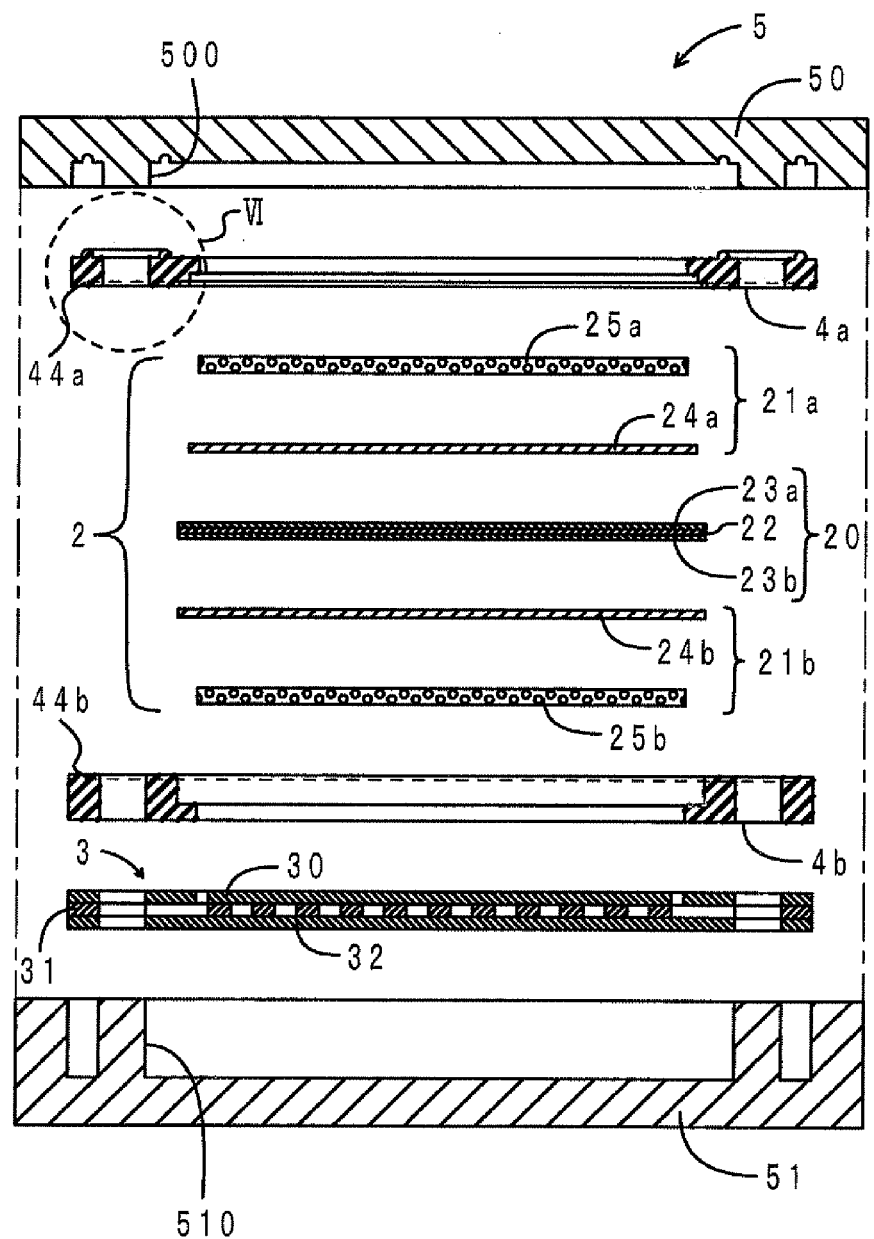
FIG. 5 is a cross-sectional view of a forming die in an open state.
Figure 6:
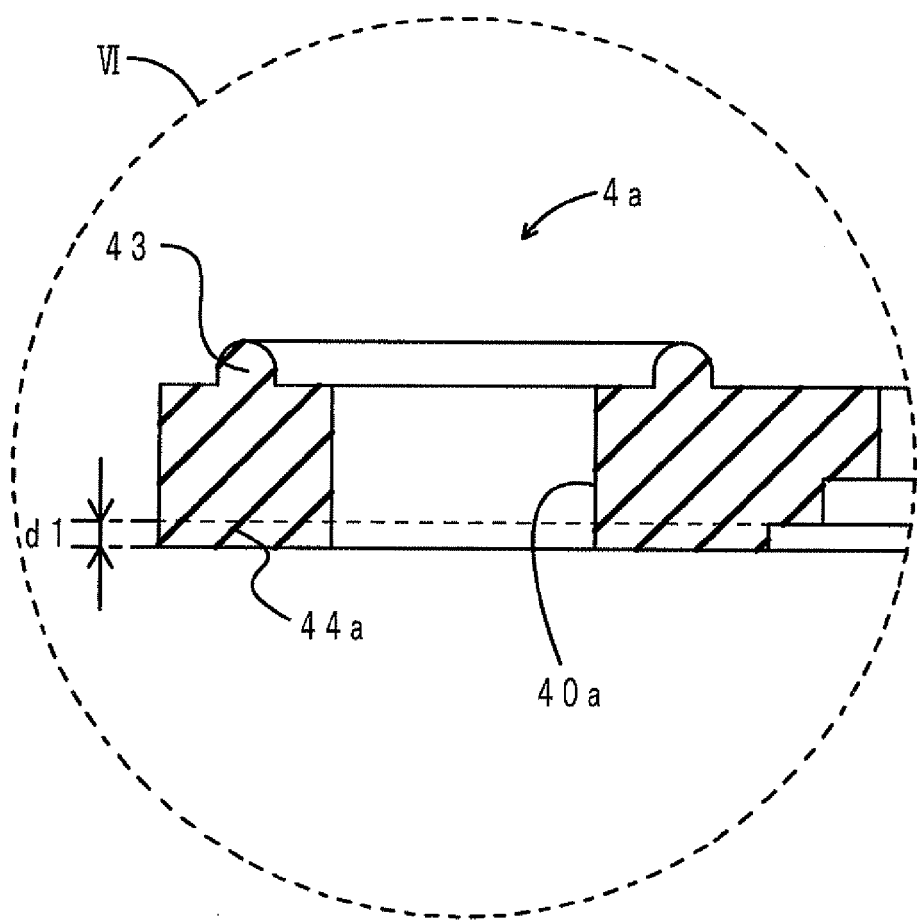
FIG. 6 is an expanded view of the inside of a dotted circle VI in FIG. 5.

The manufacturing method of the fuel cell module according to the present embodiment will be explained next. FIG. 5 shows a cross-sectional view of a forming die in an open state. FIG. 6 shows an expanded view of the inside of a dotted circle VI in FIG. 5. As illustrated in FIG. 5, a forming die 5 is provided with an upper die 50 and a lower die 51. A concave portion 500 is formed on the bottom side of the upper die 50, and a concave portion 510 is formed on the top side of the lower die 51. When the die is closed, a cavity is defined by the concave portions 500, 510.

A structural element of the module M is initially prepared. First, a first pre-crosslinking rubber member 4a and a second pre-crosslinking rubber member 4b are prepared that will become the adhesive rubber member 4 after molding. The first pre-crosslinking rubber member 4a has the shape of an upper portion when the adhesive rubber member 4 is divided into top and bottom portions along the line of the top side of the MEA 20. Similarly, the second pre-crosslinking rubber member 4b has the shape of a lower portion when the adhesive rubber member 4 is divided into top and bottom portions along the line of the top side of the MEA 20. A pre-crosslinking composition of solid rubber that uses EPDM as the rubber component is preformed to produce the first pre-crosslinking rubber member 4a and the second pre-crosslinking rubber member 4b (a preforming step).

A compression portion 44a is disposed on the bottom side of the first pre-crosslinking rubber member 4a. Likewise, a compression portion 44b is disposed on the top side of the second pre-crosslinking rubber member 4b (shown by a dotted line in FIG. 5). More specifically, as shown expanded in FIG. 6, the compression portion 44a with a thickness d1 is disposed on the bottom side of the first pre-crosslinking rubber member 4a. Here, the total volume of the first pre-crosslinking rubber member 4a and the second pre-crosslinking rubber member 4b is larger than the content of the cavity by the volume of the compression portions 44a, 44b. Therefore, as described later, once the die is closed, the first pre-crosslinking rubber member 4a and the second pre-crosslinking rubber member 4b are accommodated within the cavity while being compressed by an amount corresponding to the compression portions 44a, 44b. Forming in such a state results in the first pre-crosslinking rubber member 4a, which has melted due to heating and pressurization during forming, impregnating the end portion of the anode porous layer 21a (the gas diffusion layer 24a and the gas flow path layer 25a) so as to release a corresponding amount of compression. Likewise, the second pre-crosslinking rubber member 4b, which has melted due to heating and pressurization during forming, impregnates the end portion of the cathode porous layer 21b (the gas diffusion layer 24b and the gas flow path layer 25b) so as to release a corresponding amount of compression.

Second, the separator 3 is prepared. More specifically, the cathode plate 30, the intermediate plate 31, and the anode plate 32 are joined by an adhesive agent or the like to produce the separator 3.

Third, the electrode member 2 is prepared. The electrode member 2 is formed by stacking in order from the top the gas flow path layer 25a, the gas diffusion layer 24a, the MEA 20, the gas diffusion layer 24b, and the gas flow path layer 25b. Here, the gas diffusion layer 24a is joined by hot pressing to the top side of the MEA 20 and the gas diffusion layer 24b is joined by hot pressing to the bottom side of the MEA 20 in order to produce an assembly. The assembly produced here is referred to as a "OMEGA" below.

Next, the respective structural elements are arranged within the forming die 5 (a member arrangement step). The separator 3 is first disposed in the concave portion 510 of the lower die 51. The second pre-crosslinking rubber member 4b is then layered on the separator 3. In addition, the gas flow path layer 25b is centrally arranged within the frame of the second pre-crosslinking rubber member 4b. The MEGA is subsequently layered on the gas flow path layer 25b. Next, the first pre-crosslinking rubber member 4a is disposed on the second pre-crosslinking rubber member 4b. Finally, the gas flow path layer 25a is layered on the MEGA. Thereafter, the upper die 50 and the lower die 51 are aligned to close the die.

Figure 7:
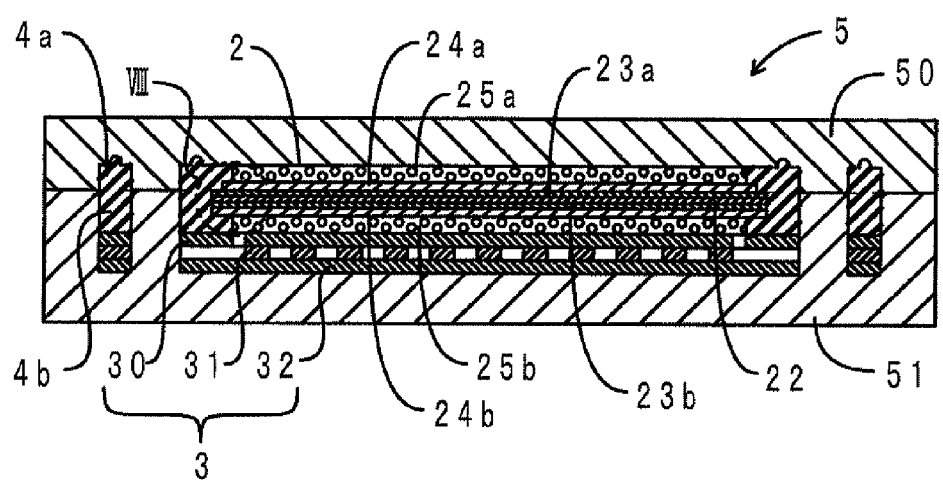
FIG. 7 is a cross-sectional view of the forming die in a closed state.
Figure 8:
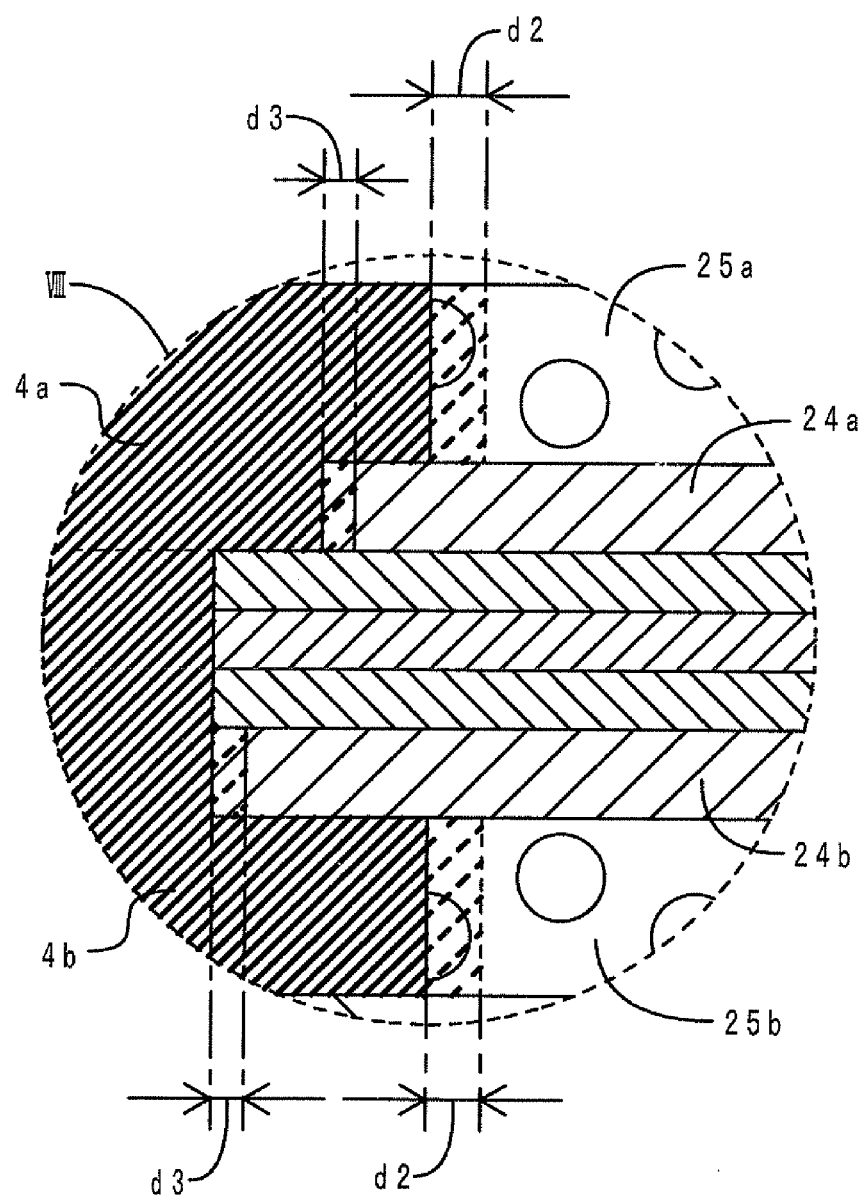
FIG. 8 is an expanded view of the inside of a dotted circle VIII in FIG. 7.

FIG. 7 shows a cross-sectional view of the forming die in a closed state. FIG. 8 shows an expanded view of the inside of a dotted circle VIII in FIG. 7. As illustrated in FIG. 7, arranged inside the cavity defined by the upper die 50 and the lower die 51 are the first pre-crosslinking rubber member 4a, the second pre-crosslinking rubber member 4b, the electrode member 2, and the separator 3. The peripheral edge portion of the electrode member 2 is coated by the first pre-crosslinking rubber member 4a and the second pre-crosslinking rubber member 4b. In addition, the second pre-crosslinking rubber member 4b is in contact with the separator 3. When the forming die 5 is heated in this state, the first pre-crosslinking rubber member 4a and the second pre-crosslinking rubber member 4b crosslink while respectively impregnating the end portions of the anode porous layer 21a (the gas diffusion layer 24a and the gas flow path layer 25a) and the cathode porous layer 21b (the gas diffusion layer 24b and the gas flow path layer 25b) of the electrode member 2. More specifically, as shown expanded in FIG. 8, the first pre-crosslinking rubber member 4a impregnates the end portion of the gas flow path layer 25a only by a length d2, and impregnates the end portion of the gas diffusion layer 24a only by a length d3. Similarly, the second pre-crosslinking rubber member 4b impregnates the end portion of the gas flow path layer 25b only by the length d2, and impregnates the end portion of the gas diffusion layer 24b only by the length d3. The first pre-crosslinking rubber member 4a and the second pre-crosslinking rubber member 4b thus integrate by crosslinking to become the adhesive rubber member 4. Accordingly, the electrode member 2 and the separator 3 are integrated by the adhesive rubber member 4 (an integration step).

[Operations and Effects]

The operations and effects of the fuel cell module according to the present embodiment will be explained next. According to the present embodiment, the modules M can be stacked to efficiently assemble the proton-exchange membrane fuel cell 9. The module M can also be extracted as necessary to enable inspection or repair. In addition, the adhesive rubber member 4 of the module M is formed from solid rubber with adhesiveness that uses EPDM as the rubber component. Therefore, tile tensile product of the adhesive rubber member 4 is large. Furthermore, the adhesive rubber member 4 also has good acid resistance. As a consequence, the sealed regions have high durability. Even without the use of an adhesive agent, the adhesive rubber member 4, the electrode member 2, and the separator 3 can be strongly adhered together. Also, the adhesive rubber member 4 is not prone to losing adhesiveness even in the operation environment of the proton-exchange membrane fuel cell 9. Therefore, during operation good sealability can be secured by the adhesive rubber member 4. Accordingly, the proton-exchange membrane fuel cell 9 can be stably operated over a long period.

Since solid rubber is used, the module M can be easily manufactured compared to the case of injection molding using liquid rubber. For example, the amount of impregnation to the end portion of the anode porous layer 21a can be regulated by the compression portion 44a of the first pre-crosslinking rubber member 4a. There is thus no need for special treatment in order to regulate the amount of impregnation. Furthermore, there is no risk of the electrolyte membrane 22 deforming due to the injection pressure of the liquid rubber. Positioning of the electrode member 2 can also be easily performed using the first pre-crosslinking rubber member 4a and the second pre-crosslinking rubber member 4b as a reference.

According to the present embodiment, the area of the MEA 20 is larger than the area of the gas diffusion layer 24a. Accordingly, even if the adhesive rubber member 4 has not sufficiently impregnated the end portion of the gas diffusion layer 24a, the adhesive rubber member 4 coating the MEA 20 and a peripheral edge portion thereof acts as a barrier, thereby suppressing the leakage of gas to the end side of the gas diffusion layer 24b.

<Second Embodiment>

The module of the present embodiment and the module of the first embodiment differ in that during the module manufacturing process, a preform is produced in advance, wherein a pre-crosslinking composition is preliminarily integrated with the peripheral edge portion of the electrode member. Accordingly, the description here will mainly concern this difference.

Figure 9:
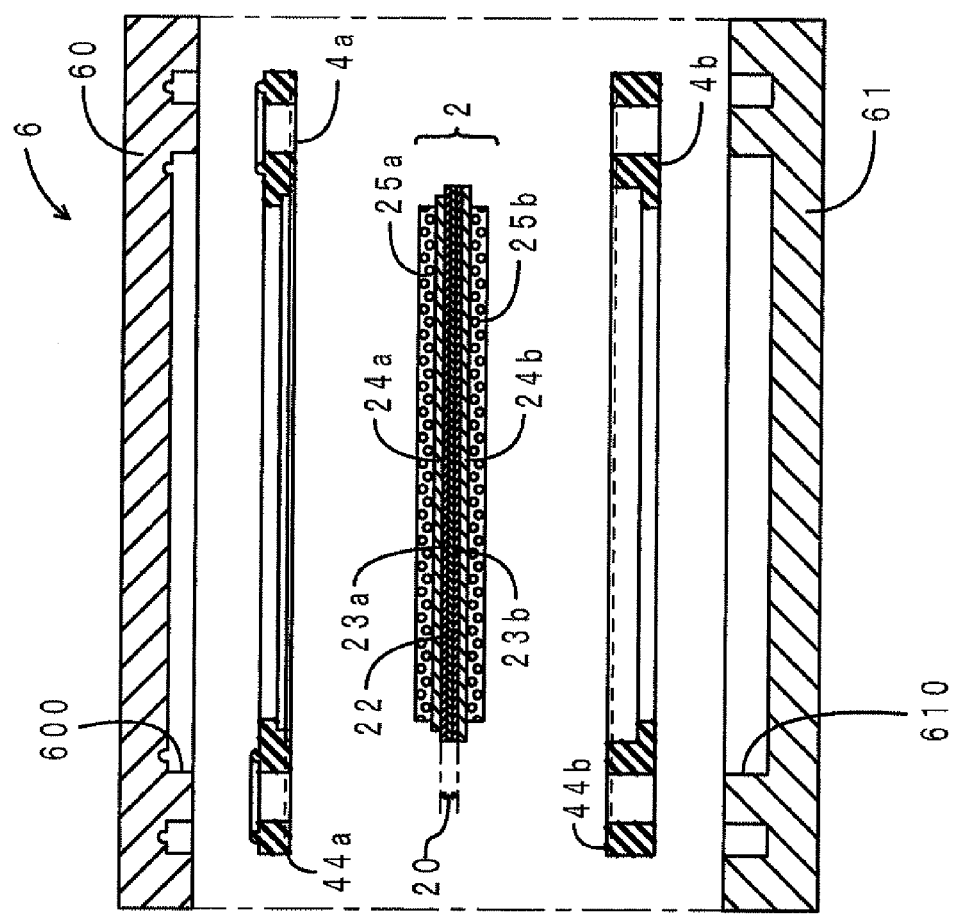
FIG. 9 is a cross-sectional view of a preforming die in an open state according to a second embodiment of the present invention.

FIG. 9 shows a cross-sectional view of a preforming die in an open state. In FIG. 9, the electrode member is shown with the respective structural elements stacked. Also, portions corresponding to FIG. 5 are indicated as the same symbols. As illustrated in FIG. 9, a preforming die 6 is provided with an upper die 60 and a lower die 61. A concave portion 600 is formed on the bottom side of the upper die 60, and a concave portion 610 is formed on the top side of the lower die 61. When the die is closed, a cavity is defined by the concave portions 600, 610.

Similar to the first embodiment above, the first pre-crosslinking rubber member 4a and the second pre-crosslinking rubber member 4b are produced by preforming a pre-crosslinking composition of solid rubber that uses EPDM as the rubber component (a first preforming step). The compression portion 44a is disposed on the bottom side of the first pre-crosslinking rubber member 4a. Likewise, the compression portion 44b is disposed on the top side of the second pre-crosslinking rubber member 4b (shown by a dotted line in FIG. 9). The total volume of the first pre-crosslinking rubber member 4a and the second pre-crosslinking rubber member 4b is larger than the content of the cavity by the volume of the compression portions 44a, 44b. Therefore, as described earlier, once the die is closed, the first pre-crosslinking rubber member 4a and the second pre-crosslinking rubber member 4b are accommodated within the cavity while being compressed by an amount corresponding to the compression portions 44a, 44b.

The electrode member 2 is formed by stacking in order from the top the gas flow path layer 25a, the gas diffusion layer 24a, the MEA 20, the gas diffusion layer 24b, and the gas flow path layer 25b. The gas diffusion layer 24a is joined by hot pressing to the top side of the MEA 20 and the gas diffusion layer 24b is joined by hot pressing to the bottom side of the MEA 20 (MEGA).

The second pre-crosslinking rubber member 4b is first disposed in the concave portion 610 of the lower die 61. The gas flow path layer 25b is then centrally arranged within the frame of the second pre-crosslinking rubber member 4b. The MESA (the gas diffusion layer 24a/the MEA 20/the gas diffusion layer 24b) is subsequently layered on the gas flow path layer 25b. Next, the first pre-crosslinking rubber member 4a is disposed on the second pre-crosslinking rubber member 4b. Finally, the gas flow path layer 25a is layered on the MEGA. Thereafter, the upper die 60 and the lower die 61 are aligned to close the die.

In this state, the preforming die 6 is heated to around a temperature at which the first pre-crosslinking rubber member 4a and the second pre-crosslinking rubber member 4b do not crosslink. Accordingly, the first pre-crosslinking rubber member 4a and the second pre-crosslinking rubber member 4b partially impregnate the end portions of the anode porous layer 21a (the gas diffusion layer 24a and the gas flow path layer 25a) and the cathode porous layer 21b (the gas diffusion layer 24b and the gas flow path layer 25b) of the electrode member 2, respectively. Meanwhile, since the heating temperature is lower than the crosslinking temperature, the first pre-crosslinking rubber member 4a and the second pre-crosslinking rubber member 4b do not crosslink. Thus, the electrode member 2, and the first pre-crosslinking rubber member 4a and the second pre-crosslinking rubber member 4b, are preliminarily integrated to become a preform (a second preforming step).

Figure 10:
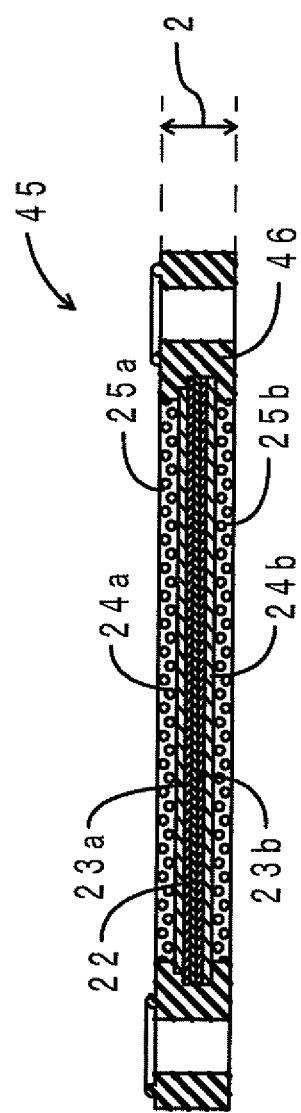
FIG. 10 is a cross-sectional view of a preform.

FIG. 10 shows a cross-sectional view of the obtained preform. As illustrated in FIG. 10, a preform 45 is formed from the electrode member 2 and a pre-crosslinking combined rubber member 46. The pre-crosslinking combined rubber member 46 is an assembly of the first pre-crosslinking rubber member 4a and the second pre-crosslinking rubber member 4b. The pre-crosslinking combined rubber member 46 partially impregnates (not shown) and is fixed to the peripheral edge portion of the electrode member 2.

The obtained preform 45 is next disposed in the forming die 5 along with the separator 3 (see FIG. 5). Namely, after disposing the separator 3 in the concave portion 510 of the lower die 51, the preform 45 is layered on the separator 3. The upper die 50 and the lower die 51 are then aligned to close the die. When the forming die 5 is heated in this state, the pre-crosslinking combined rubber member 46 becomes crosslinked while further impregnating the end portions of the anode porous layer 21a (the gas diffusion layer 24a and the gas flow path layer 25a) and the cathode porous layer 21b (the gas diffusion layer 24b and the gas flow path layer 25b) of the electrode member 2. The pre-crosslinking combined rubber member 46 becomes the adhesive rubber member 4 due to crosslinking. Accordingly, the electrode member 2 and the separator 3 are integrated by the adhesive rubber member 4 (an integration step).

The module of the present embodiment has operations and effects similar to the module of the first embodiment regarding parts with common structures. According to the manufacturing method of the module of the present embodiment, by producing the preform 45 in advance, positioning of the structural elements of the electrode member 2 can be more easily performed in the integration step. Thus, the fuel cell module of the present invention can be manufactured with greater efficiency.

Note that in the present embodiment, similar to the first embodiment, the pre-crosslinking rubber member 4a is preformed so as to have the shape of an upper portion when the adhesive rubber member 4 is divided into top and bottom portions along the line of the top side of the MEA 20. The second pre-crosslinking rubber member 4b is also preformed so as to have the shape of a lower portion when the adhesive rubber member 4 is divided into top and bottom portions along the line of the top side of the MEA 20 (see FIG. 4). Therefore, the first pre-crosslinking rubber member 4a and the second pre-crosslinking rubber member 4b both have a convex portion 43 (before crosslinking and likewise below in the present embodiment). However, the forming of the convex portion 43 is not necessarily required during the preforming of the pre-crosslinking composition (the first preforming step). In other words, the convex portion 43 may be formed by a step separate from the first preforming step. For example, the convex portion 43 may be formed by providing a convex portion formation step between the second preforming step and the integration step. Alternatively, the convex portion 43 maybe formed while crosslinking is performed in the integration step.

<Other Embodiments>

Embodiments of the fuel cell module of the present invention were described above. However, embodiments are not particularly limited to those described above. Various modified embodiments and improved embodiments which can be carried out by those skilled in the art are also accepted.

Namely, the respective elements structuring the fuel cell module are not limited to the above embodiments in terms of material, shape, size, and the like. For example, in addition to the perfluorosulfonic acid film, a perfluorophosphonic acid film, a perfluorocarboxylic acid film, or a hydrocarbon polymer film may be used for the electrolyte membrane. In the above embodiments, the pair of porous layers is structured from a gas diffusion layer and a gas flow path layer with different porosities. In such case, the porosity, area, thickness, and the like of both layers should be set as appropriate. Furthermore, the configurations of the pair of porous layers may be identical or different. For example, the fuel cell module maybe structured by stacking the separator and an electrode member having porous layers with different configurations as described in (1) and (2) below.

(1) [Gas Flow Path Layer/Gas Diffusion Layer/MEA/Gas Flow Path Layer/Separator]

According to an electrode member having the present configuration, a porous layer disposed on one side of the MEA in the thickness direction is formed from a gas diffusion layer that is disposed on one side of the MEA in the thickness direction and a gas flow path layer that is disposed on one side of the gas diffusion layer in the thickness direction and that has a greater porosity than the gas diffusion layer. A porous layer disposed on another side of the MEA in the thickness direction is formed from a gas flow path layer disposed on the other side of the MEA in the thickness direction.

(2) [Gas Flow Path Layer/Gas Diffusion Layer/MEA/Gas Diffusion Layer/Separator]

According to an electrode member having the present configuration, a porous layer disposed on one side of the MEA in the thickness direction is formed from a gas diffusion layer that is disposed on one side of the MEA in the thickness direction and a gas flow path layer that is disposed on one side of the gas diffusion layer in the thickness direction and that has a greater porosity than the gas diffusion layer. A porous layer disposed on another side of the MEA in the thickness direction is formed from a gas diffusion layer disposed on the other side of the MEA in the thickness direction.

In the above embodiments, the area of one gas diffusion layer is smaller than the area of the MEA. However, the areas of the pair of gas diffusion layers may be the same as the area of the MEA. Conversely, the areas of both layers may each be smaller than the area of the MEA. In the above embodiments, the separator has a three-layer structure. However, the structure of the separator is not particularly limited thereby.

In the above embodiments, pre-crosslinking rubber members (a preformed pre-crosslinking composition) are used in the manufacturing of the fuel cell modules, which have shapes that divide into two the adhesive rubber member. However, the pre-crosslinking rubber member is not necessarily required to be a divided body of the adhesive rubber member. In the case where a divided body is used, the thickness and material of the pre-crosslinking rubber member may be adjusted depending on the properties required by the seal region. Furthermore, rubbers made of different materials may be used for each seal region. Depending on the type of rubber, the heating temperature and the like during the integration step may also be adjusted. In the above second embodiment, heating to around a temperature at which the pre-crosslinking composition does not crosslink is performed to preliminarily integrate the electrode member and the pre-crosslinking composition (the second preforming step). The temperature of the present step as well may be adjusted as appropriate depending on the type of rubber. The adhesive rubber member will be described in detail below.

[Adhesive Rubber Member]

In the fuel cell module of the present invention, a rubber material with adhesiveness, wherein a crosslinked item thereof has a tensile product of 1,500 MPa·% or more, can be used as the adhesive rubber member. The Mooney viscosity of the rubber member before crosslinking is preferably 40 M at 80° C. [40 ML (1+4) 80° C.] or more. The Mooney viscosity employs a value measured in accordance with JIS K6300-1 (2001). More specifically, a solid rubber containing a rubber component such as the following maybe used: ethylene-polypropylene rubber (EPM), ethylene-polypropylene-diene rubber (EPDM), acrylonitrile-butadiene rubber (NBR), hydrogenated acrylonitrile-butadiene rubber (H-NBR), styrene-butadiene rubber (SBR), and butadiene rubber (BR). The Type A durometer hardness of the crosslinked item (the adhesive rubber member) is preferably 50 or more. Type A durometer hardness is a hardness measured by a Type A durometer as specified in JIS K6253 (2006).

For example, a rubber composition including the following contents of (A) to (D) is capable of crosslinking at a low temperature, and is well-suited in terms of high adhesive reliability and sealability of the crosslinked item. (A) One or more rubber components selected from a group consisting of ethylene-propylene rubber (EPM), ethylene-propylene-diene rubber (EPDM), acrylonitrile-butadiene rubber (NBR), and hydrogenated acrylonitrile-butadiene rubber (H-NBR); (B) a crosslinking agent selected from organic peroxides of which a 1-hour half-life period temperature is lower than or equal to 130° C.; (C) a crosslinking auxiliary agent; and (D) an adhesive component formed of at least one of a resorcinol compound together with a melamine compound and a silane coupling agent.

The crosslinking agent (B) is selected from organic peroxides of which the 1-hour half-life period temperature is lower than or equal to 130° C. Such organic peroxides include peroxyketal, peroxyester, diacyl peroxide, peroxydicarbonate, and the like. Particularly, at least one of the peroxyketal and the peroxyester of which the 1-hour half-life period temperature is higher than or equal to 100° C. is preferably employed, since crosslinking easily occurs at a temperature of approximately 130° C. and the rubber composition in which the crosslinking agent is added and kneaded can be handled easily. Particularly, one with a 1-hour half-life period temperature of 110° C. or higher is preferable.

Examples of the peroxyketal include n-butyl 4,4-di(t-butylperoxy)valerate, 2,2-di(t-butylperoxy)butane, 2,2-di(4,4-di(t-butylperoxy)cyclohexyl)propane, 1,1-di(t-butylperoxy)cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, and the like. Examples of the peroxyester include t-butyl peroxyienzoate, t-butyl peroxyacetate, t-hexyl peroxybenzoate, 2,5-dimethyl-2,5-di(benzoylperoxy)hexane, t-butyl peroxy-2-ethylhexyl monocarbonate, t-butyl peroxylaurate, t-butyl peroxyisopropylmonocarbonate, t-butyl peroxy-3,3,5-trimethylhexanoate, t-butyl peroxymaleic acid, t-hexyl peroxyisopropylmonocarbonate, and the like. Particularly, 1,1-di(t-butylperoxy)cyclohexane and t-butyl peroxyacetate are preferable, since the crosslinking agent using them is easily stored.

The amount of the crosslinking agent is preferably greater than or equal to 1 part by weight with respect to 100 parts by weight of the rubber component (A) described above so that the crosslinking reaction progresses sufficiently. In consideration of the storage stability of the prepared rubber composition, it is preferably less than or equal to 5 parts by weight.

The crosslinking auxiliary agent (C) may appropriately be selected according to the type of crosslinking agent (B) described above. Examples of the crosslinking auxiliary agent include a maleimide compound, triallyl cyanurate (TAC), triallyl isocyanurate (TAIC), trimethylolpropane trimethacrylate (TMPT), and the like. Particularly, using the maleimide compound is preferable since the crosslinking speed becomes faster. In this case, the amount of the crosslinking auxiliary agent is preferably greater than or equal to 0.1 parts by weight with respect to 100 parts by weight of the rubber component (A) described above so that the crosslinking reaction progresses sufficiently. The amount of the crosslinking auxiliary agent is preferably less than or equal to 3 parts by weight, since the adhesive force decreases when the crosslinking reaction becomes too fast due to a large amount of the crosslinking auxiliary agent.

The adhesive component (D) is formed of at least one of the resorcinol compound together with the melamine compound and the silane coupling agent. That is, the adhesive component may be only the resorcinol compound and the melamine compound, or only the silane coupling agent. In the case where both the resorcinol compound together with the melamine compound and the silane coupling agent are included, the adhesive force is further improved.

Examples of the resorcinol compound include resorcin, modified resorcin-formaldehyde resin, resorcin-formaldehyde (RF) resin, and the like. A single one or a mixture of two or more of these may be used. Particularly, the modified resorcin-formaldehyde resin is preferable in terms of low volatility, low hygroscopicity, and high compatibility with rubber. Examples of the modified resorcin-formaldehyde resin include those represented by general formulas (1) to (3) below. One shown by the general formula (1) is particularly preferable. Note that reference symbol "R" indicates a hydrocarbon group in the general formula (1). Reference symbols "n" all indicate an integer in the general formulas (1) to (3).

[General Formula (1)]

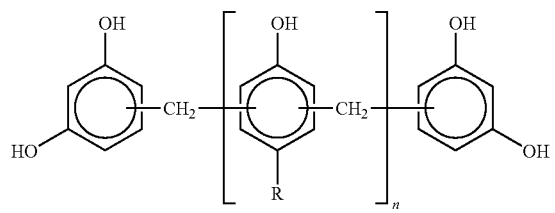

(1)

[General Formula (2)]

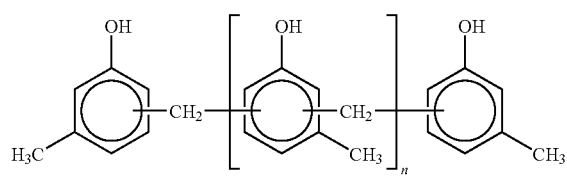

(2)

[General Formula (3)]

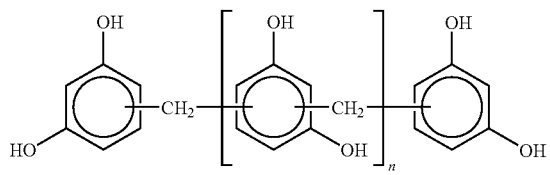

(3)

In order to obtain a desired adhesive force, the amount of the resorcinol compound is preferably greater than or equal to 0.1 parts by weight with respect to 100 parts by weight of the rubber component (A) described above. It is more preferably greater than or equal to 0.5 parts by weight. The amount of the resorcinol compound is preferably less than or equal to 10 parts by weight, since an excessive amount of the resorcinol compound causes a decrease in the properties of rubber. It is more preferably less than or equal to 5 parts by weight.

Examples of the melamine compound include a methylated formaldehyde melamine polymer, hexamethylene tetramine, and the like. One or more of these compounds may be used singly or in combination. These are decomposed by heat in the crosslinking, and supply formaldehyde to the system. Particularly, the methylated formaldehyde melamine polymer is preferable in terms of low volatility, low hygroscopicity, and high compatibility with rubber. The methylated formaldehyde melamine polymer represented by a general formula (4) below is preferable, for example. In the formula (4), reference symbol "n" indicates an integer. Particularly, a mixture including 43 to 44% by weight of a compound in which n=1, 27 to 30% by weight of a compound in which n=2, and 26 to 30% by weight of a compound in which n=3 in the general formula (4) is preferable.

[General Formula (4)]

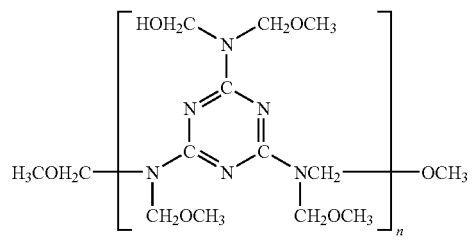

(4)

The compound ratio of the resorcinol compound and the melamine compound is preferably in a range of 1:0.5 to 1:2 by weight. It is more preferably in a range of 1:0.77 to 1:1.5. In the case where the compound ratio of the melamine compound with respect to the resorcinol compound is less than 0.5, the tensile strength, the stretch, and the like of the rubber tend to slightly decrease. On the other hand, when the compound ratio of the melamine compound exceeds 2, the adhesive force reaches a limit. Therefore, further increase in the compound ratio of the melamine compound leads to an increase in cost.

The silane coupling agent may appropriately be selected in consideration of the adhesiveness and the like from a group of compounds having an epoxy group, an amino group, a vinyl group, or the like as a functional group. Examples include vinyltrimethoxysilane, vinyltriethoxysilane, vinyl-tris(2- methoxyethoxy)silane, 3-methacryloxypropyltrimethoxysilane, 3-methacryloxypropyltriethoxysilane, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, N-2(aminoethyl)3-aminopropyltrimethoxysilane, 3-aminopropyltrimethoxysilane, N-phenyl-3-aminopropyltrimethoxysilane, and the like. One or more of these compounds may be used singly or in combination. Particularly, when one or more selected from the group of compounds having an epoxy group is used, the adhesive force is improved, and the adhesive force hardly decreases even in the operational environment of a fuel cell. Specifically, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, and the like are preferable.

In order to obtain a desired adhesive force, the amount of the silane coupling agent is preferably greater than or equal to 0.5 parts by weight with respect to 100 parts by weight of the rubber component (A) described above. It is more preferably greater than or equal to 2 parts by weight. An excessive amount of silane coupling agent leads to a decrease in the properties of rubber, and possibly a decrease in processability. Therefore, the amount of the silane coupling agent is preferably less than or equal to 10 parts by weight, and more preferably, less than or equal to 6 parts by weight.

The rubber composition may include various additives which are used as additives for general rubber other than the contents of (A) to (D) described above. For example, it is preferable to include carbon black as a reinforcing agent. The grade of the carbon black is not particularly limited, and may appropriately be selected from SAF, ISAF, HAF, MAF, FEF, GPF, SRF, FT, MT, and the like. In order to obtain desired durability, the amount of the carbon black is preferably greater than or equal to 30 parts by weight with respect to 100 parts by weight of the rubber component (A) described above. Note that the amount of the carbon black is preferably less than or equal to 150 parts by weight in consideration of the easiness of kneading, forming processability, and the like.

Other additives include a softener, a plasticizer, an antioxidant, a tackifier, a processing aid, and the like. The softeners include: petroleum-based softeners such as process oil, lubricating oil, paraffin, liquid paraffin, and petrolatum; fatty oil-based softeners such as castor oil, linseed oil, canola oil, and palm oil; waxes such as tall oil, a rubber substitute, beeswax, carnauba wax, and lanolin; linoleic acid; palmitic acid; stearic acid; lauric acid; and the like. The amount of the softener is preferably up to approximately 40 parts by weight with respect to 100 parts by weight of the rubber component (A) described above. The plasticizers include organic acid derivatives such as dioctyl phthalate (DOP) and phosphoric acid derivatives such as tricresyl phosphate. The amount of the plasticizer is preferably approximately 40 parts by weight at most with respect to 100 parts by weight of the rubber component (A) described above, in a similar manner to that of the softener. The antioxidants include phenolic antioxidants, imidazole-based antioxidants, waxes, and the like, and the amount is preferably approximately 0.5 to 10 parts by weight with respect to 100 parts by weight of the rubber component (A) described above.

The rubber composition can be prepared by mixing the contents of (A) to (D) described above and the various additives as necessary. For example, the respective materials other than the crosslinking agent (B), the crosslinking auxiliary agent (C), and the adhesive component (D) are mixed in advance, and then are kneaded for several minutes at 80 to 140° C. After the kneaded product is cooled, the crosslinking agent (B), the crosslinking auxiliary agent (C), and the adhesive component (D) are added, and are kneaded for 5 to 30 minutes at a roll temperature of 40 to 70° C. using a roller such as an open roller, whereby the rubber composition can be prepared. Note that the adhesive component (D) may be added at the time of the preparatory mixture.

What is claimed is:

1. A fuel cell module comprising:
   an electrode member having:
      a membrane electrode assembly, which is formed from an electrolyte membrane and a pair of electrode catalyst layers that is disposed on both sides of the electrolyte membrane in a thickness direction, and
      a pair of porous layers disposed on both sides of the membrane electrode assembly in the thickness direction;
   a separator disposed layered on the electrode member so as to contact at least one of the porous layers; and
   an adhesive rubber member sealing a peripheral edge portion of the electrode member,
   wherein:
   the pair of porous layers each include a gas diffusion layer;
   a planar area of the membrane electrode assembly is larger than that of at least one gas diffusion layer;
   at least one porous layer among the pair of porous layers includes a gas flow path whose porosity is larger than that of the gas diffusion layer, the gas flow path layer being disposed on an opposite side of the gas diffusion layer from the membrane electrode assembly, and a planar area of the gas flow path layer being smaller than that of the gas diffusion layer;
   the electrode member and the separator are adhered together by the adhesive rubber member so as to be integrated;
   the adhesive rubber member is formed from solid rubber containing at least one rubber component selected from the group consisting of ethylene-propylene rubber, ethylene-propylene-diene rubber, acrylonitrile-butadiene rubber, hydrogenated acrylonitrile-butadiene rubber, styrene-butadiene rubber, and butadiene rubber, and has a tensile product of 1,500 MPa·% or more;
   a preformed pre-crosslinking composition of the solid rubber is arranged so as to coat the peripheral edge portion of the electrode member and contact the separator;
   the preformed pre-crosslinking composition is crosslinked while impregnating the porous layer of the electrode member with the preformed pre-crosslinking composition; and
   the electrode member, the separator, and the adhesive rubber member are integrally molded.

2. The fuel cell module according to claim 1, wherein the preformed pre-crosslinking composition of the solid rubber includes the following contents of (A) to (D):
   (A) at least one rubber component selected from the group consisting of ethylene-propylene rubber, ethylene-propylene-diene rubber, acrylonitrile-butadiene rubber, and hydrogenated acrylonitrile-butadiene rubber;
   (B) a crosslinking agent selected from organic peroxides of which a 1-hour half-life period temperature is greater than or equal to 100° C. and lower than or equal to 130° C.;
   (C) a crosslinking auxiliary agent; and
   (D) an adhesive component that is formed of at least one of a resorcinol compound together with a melamine compound and a silane coupling agent, wherein the adhesive component bonds the adhesive rubber member, the electrode member, and the separator.

3. The fuel cell module according to claim 1, wherein a preform, which is produced in advance by integrating the preformed pre-crosslinking composition of the solid rubber with the peripheral edge portion of the electrode member, is arranged so as to contact the separator.

4. The fuel cell module according to claim 1, wherein the preformed pre-crosslinking composition of the solid rubber has a compression portion which impregnates the porous layer.

5. The fuel cell module according to claim 3, wherein the preformed pre-crosslinking composition of the solid rubber has a compression portion which impregnates the porous layer.

6. A fuel cell module comprising:
an electrode member having:
   a membrane electrode assembly, which is formed from an electrolyte membrane and a pair of electrode catalyst layers that is disposed on both sides of the electrolyte membrane in a thickness direction, and
   a pair of porous layers disposed on both sides of the membrane electrode assembly in the thickness direction;
a separator disposed layered on the electrode member so as to contact at least one of the porous layers; and
an adhesive rubber member sealing a peripheral edge portion of the electrode member,
wherein;
at least one porous layer among the pair of porous layers has a gas diffusion layer;
a planar area of the membrane electrode assembly is larger than that of at least one gas diffusion layer;
the electrode member and the separator are adhered together by the adhesive rubber member so as to be integrated;
the adhesive rubber member is formed from solid rubber containing at least one rubber component selected from the group consisting of ethylene-propylene rubber, ethylene-propylene-diene rubber, acrylonitrile-butadiene rubber, hydrogenated acrylonitrile-butadiene rubber, styrene-butadiene rubber, and butadiene rubber, and has a tensile product of 1,500 MPa·% or more;
a preformed pre-crosslinking composition of the solid rubber is arranged so as to coat the peripheral edge portion of the electrode member and contact the separator;
the preformed pre-crosslinking composition is crosslinked while impregnating the porous layer of the electrode member with the reformed pre-crosslinking composition;
the preformed pre-crosslinking composition of the solid rubber includes the following contents of (A) to (D):
   (A) at least one rubber component selected from the group consisting of ethylene-propylene rubber, ethylene-propylene-diene rubber, acrylonitrile-butadiene rubber, and hydrogenated acrylonitrile-butadiene rubber;
   (B) a crosslinking agent selected from organic peroxides of which a 1-hour half-life period temperature is greater than or equal to 100° C. and lower than or equal to 130° C.;
   (C) a crosslinking auxiliary agent; and
   (D) an adhesive component that is formed of a resorcinol compound together with a melamine compound, or both the resorcinol compound together with the melamine compound and the silane coupling agent, wherein the adhesive component bonds the adhesive rubber member, the electrode member, and the separator; and
the electrode member, the separator, and the adhesive rubber member are integrally molded.

* * * * *